United States Patent [19]
Chen et al.

[11] Patent Number: 4,672,049
[45] Date of Patent: Jun. 9, 1987

[54] HYDROPROCESSING CATALYST

[75] Inventors: Nai Yuen Chen, Titusville; Tracy J. Huang, Lawrenceville, both of N.J.

[73] Assignee: Mobil Oil Corporation, New York, N.Y.

[21] Appl. No.: 837,865

[22] Filed: Mar. 5, 1986

Related U.S. Application Data

[63] Continuation of Ser. No. 664,827, Oct. 25, 1984, abandoned.

[51] Int. Cl.$^4$ ............................................. B01J 29/32
[52] U.S. Cl. ...................................... 502/66; 502/74; 502/207
[58] Field of Search ................... 502/66, 74, 202, 204, 502/207; 208/111

[56] References Cited

U.S. PATENT DOCUMENTS

| | | | |
|---|---|---|---|
| 2,980,604 | 4/1961 | Adams et al. | 208/111 |
| 3,923,641 | 12/1975 | Morrison | 208/111 |
| 3,954,670 | 5/1976 | Pine | 502/66 X |
| 4,080,284 | 3/1978 | Mitchell | 208/111 |
| 4,268,420 | 5/1981 | Klotz | 208/111 |
| 4,419,220 | 12/1983 | La Pierre et al. | 208/111 |
| 4,458,024 | 7/1984 | Oleck et al. | 208/111 X |

Primary Examiner—Carl F. Dees
Attorney, Agent, or Firm—Alexander J. McKillop; Michael G. Gilman; Malcolm D. Keen

[57] ABSTRACT

This invention provides a novel hydrocracking catalyst composition that contains Zeolite Beta having a framework boron content, a solid source of alumina, and a hydrogenation component. It further provides a low-pressure hydrocracking process that uses such composition.

9 Claims, 1 Drawing Figure

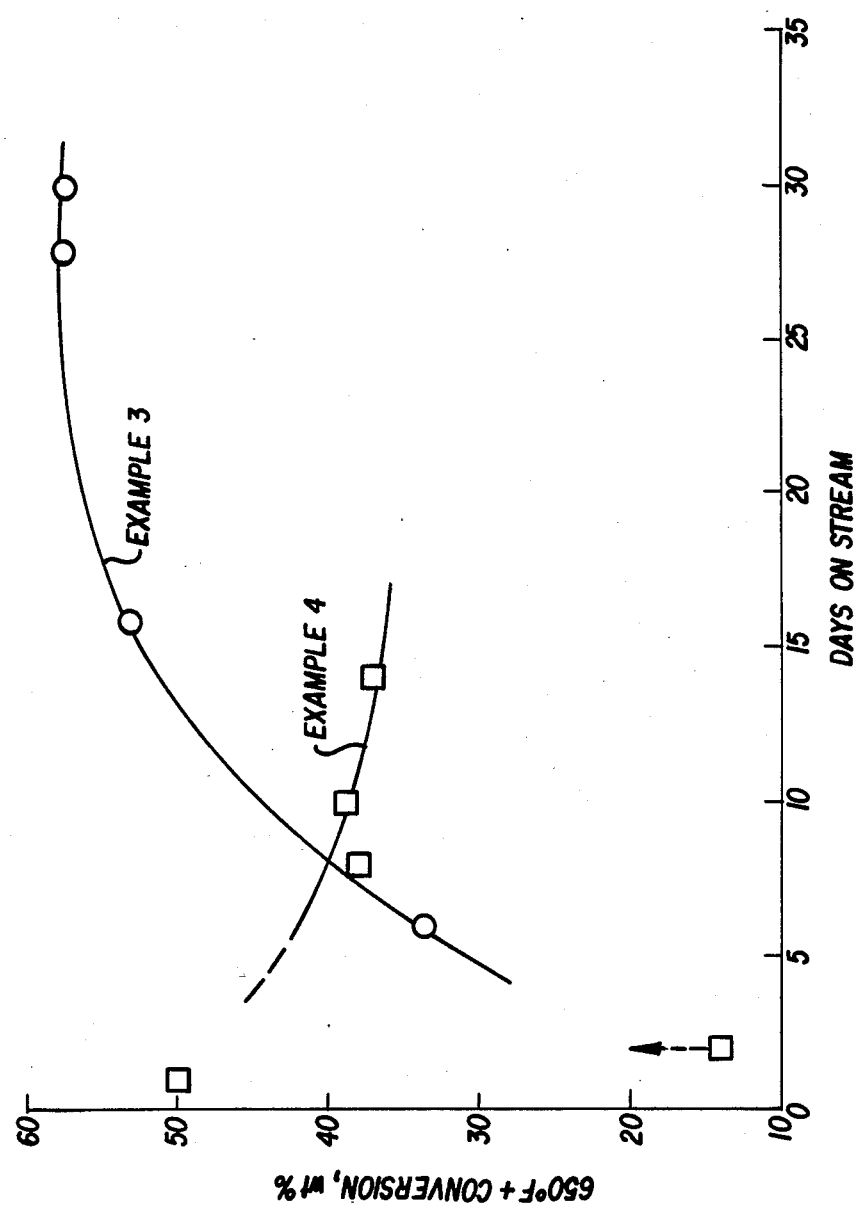

4,672,049

HYDROPROCESSING CATALYST

This is a continuation of copending application Ser. No. 664,827, filed on Oct. 25, 1984 now abandoned.

FIELD OF THE INVENTION

This invention is concerned with a novel catalyst composition. More particularly, it is concerned with a catalyst composition comprising Zeolite Beta that contains framework boron. This invention further is concerned with a process that employs such catalyst for hydrocracking hydrocarbons.

BACKGROUND AND PRIOR ART

Zeolite Beta is one of a number of synthetic crystalline zeolites discovered in recent years which, in the as-synthesized state, can have a silica to alumina ratio greater than 10. The synthesis and characteristics, including its X-ray diffraction pattern, are described in U.S. Pat. Re. No. 28,341 to Wadlinger et al. The entire contents of U.S. Pat. Re. No. 28,341 are incorporated herein by reference as if fully set forth. The use of Zeolite Beta for the hydroconversion of hydrocarbons has been described in several patents. For example, U.S. Pat. No. 3,923,641 to Morrison describes and claims the hydrocracking of $C_5+$ naphthas with high selectivity for isobutane. U.S. Pat. No. 4,428,819 to Shu discloses a process for hydrofinishing a hydrodewaxed oil over Zeolite Beta. U.S. Pat. No. 4,419,220 to La Pierre et al. discloses and claims a process for dewaxing a feedstock containing straight chain paraffins over Zeolite Beta. All of these processes utilize a catalyst that contains a hydrogenation component.

Among the hydroconversion processes, catalytic hydrocracking is a petroleum refining process of increasing importance due to the similarly rapid increase in the demand for middle-distillate fuels. In general the process comprises converting heavy petroleum feedstocks, a substantial fraction or all of which boils above about 700° F. at atmospheric pressure, to lower-boiling products in the range of about 300° F. to about 700° F., e.g. to gasoline, petrochemical naphthas, furnace oil, and diesel and turbine fuels. The catalysts employed are of the dual functional type and comprise a hydrogenation-dehydrogenation component, such as a Group VIII noble metal, or a combination of Group VIII and Group VIA metal, in combination with a solid acid support, such as silica-alumina or an aluminosilicate, which is the acidic cracking component.

Of the solid acid components, it is generally considered that zeolitic aluminosilicates are the most active in the sense that they convert the highest fraction of feedstock to products under reasonable operating conditions. However, activity is only one requirement. Equally important is stability, which is a measure of the useful operating life of the catalyst. To achieve reasonable catalyst stability in a hydrocracking operation, it has been heretofore necessary to operate at relatively high hydrogen pressures, e.g. at pressures from about 1500 to as high as 4000 pounds per square inch.

It is an object of this invention to provide a novel hydrocracking catalyst composition of improved stability. It is a further object of this invention to provide an improved hydrocracking process for converting hydrocarbon feeds. It is a further object to provide an improved hydrocracking process for converting heavy petroleum feedstocks to lower boiling products in the range of $C_5+$ to about 700° F. It is a further object of this invention to provide a process for hydrocracking heavy petroleum feedstocks at a pressure not greater than about 1000 psig. These and other objects will become apparent to one skilled in the art on reading this entire specification including the appended claims.

BRIEF SUMMARY OF THE INVENTION

We have now discovered that a hydrocracking catalyst of unusual stability is prepared by compositing a Zeolite Beta that contains framework boron with a solid source of alumina and with a hydrogenation component, all as more fully described hereinbelow. As will be illustrated by example, this improved stability is associated with the presence of framework boron in the zeolite.

The novel catalyst is particularly useful in a hydrocracking process for converting a heavy petroleum feedstock, a substantial fraction or all of which boils above about 700° F. With such feed, stable operation is achieved at a pressure not greater than 1000 psig.

BRIEF DESCRIPTION OF THE DRAWING

FIG. 1 of the drawing illustrates catalyst stability at low pressure.

PREFERRED EMBODIMENTS

The catalyst of this invention is a composite of at least three components: Zeolite Beta that contains at least 0.1 wt %, and preferably at least 0.5 wt %, of framework boron; a solid source of alumina; and a hydrogentation component.

It is well known that the crystalline zeolites, including Zeolite Beta, have a structure consisting of a porous robust framework, the framework itself consisting principally of silicon tetrahedrally coordinated and interconnected with oxygen bridges. A minor amount of an element (alumina in the case of ordinary Zeolite Beta) is also coordinated and part of the robust framework. The zeolite also contains, but not as part of the framework, material in the pores of the structure. This pore material may be cations such as protons, with or without other cations and sorbed substances. The term "framework" boron is used herein to distinguish between material in the framework of the zeolite, which is evidenced by contributing ion exchange capacity to the zeolite, from material which is in the pores and which has no effect on total ion-exchange capacity.

Methods for preparing high silica content zeolites that contain framework boron are known and are not considered part of the present invention. Illustrative of such preparation, however, is U.S. Pat. No. 4,269,813. The amount of boron contained in the zeolite usually may be made to vary by incorporating different amounts of borate ion in the zeolite forming solution. By way of illustration, a boron-containing Zeolite Beta was prepared from a forming solution that included boric acid. This material was calcined in air and converted to the ammonium form by exchanging the calcined base with $NH_4NO_3$ solutions at an adjusted solution pH of 9 to 10 range. The water washed and dried $NH_4$ form was found to have the X-ray diffraction pattern of Zeolite Beta and the following elemental analysis:

| | |
|---|---|
| $SiO_2$ | 79.2% Weight |
| $Al_2O_3$ | 0.72% Weight |

-continued

| | |
|---|---|
| B$_2$O$_3$ | 3.28% Weight |
| Na | 0.02% Weight |
| N | 1.14% Weight |
| Ash | 82.4% Weight |

The principal lines and their relative intensities (R.I.) for Zeolite Beta are given below in Table I.

TABLE 1

Zeolite Beta

| d-Spacing (A.U.) | R.I. |
|---|---|
| 11.5 ± 0.3 | M-S |
| 7.4 ± 0.2 | W |
| 6.6 ± 0.15 | W |
| 4.15 ± 0.10 | W |
| 3.97 ± 0.10 | VS |
| 3.00 ± 0.07 | W |
| 2.05 ± 0.05 | W |

For purposes of the present invention, the zeolite must contain at least 0.1 wt % framework boron. However, it may contain up to about 4 wt %. The zeolite will usually contain some framework alumina. For purpose of the present invention, the catalyst is prepared with a zeolite having essentially the X-ray diffraction pattern of Zeolite Beta, a framework boron content of at least 0.1 wt %, and preferably at least 0.5 wt %, and a silica to alumina ratio greater than 35, preferably greater than about 100.

The preferred solid source of alumina is an aluminum oxide, preferably alpha-alumina monohydrate. It is contemplated that other solid sources of alumina also may be used such as amorphous silica-alumina and clays such as montmorillonite. The amount of solid source of alumina is not believed to be critical. The final catalyst composition may contain Zeolite Beta and a source of alumina in the weight ratios of 10:1 to 1:10. The solid source of alumina may serve as binder for the zeolite component, in which case the preferred weight ratios of Zeolite Beta and solid source of alumina are from about 2:3 to 3:1.

The hydrogenation component contains at least one transition metal which is selected from Group VIII of the Periodic Table. If a second metal is used, it is selected from Groups IVB, VIA, VIIA, and VIII of the Periodic Table. The Periodic Table referred to herein is that published by Fischer Scientific Company, Copyright 1978, and listed as Catalog No. 5-702-10. Typical examples of hydrogenation components are Pt, Pd, Ru, NiW, CoMo, NiMo, PtRe, PtGe and PtSn. The hydrogenation component is incorporated into the catalyst by conventional methods such as ion exchange or impregnation.

The zeolite component should comprise at least 10 weight percent of the final catalyst composition (on anhydrous basis), and preferably about 30 to 85 wt %. The zeolite constituent may be employed as the sole acidic constituent, or it may be used in combination with any of the solid acid catalysts components (such as silica-alumina) which are known to be useful in hydrocracking catalysts.

The hydrogenation component of the present catalyst composition include the Group VIII non-noble metals, particularly platinum and palladium, which metals may be present in an amount of 0.2 to 2.5 wt % of the final catalyst composition, but when the feedstocks being hydrocracked contain more than about 1.0 weight percent sulfur, the metals are preferably a combination of Group VIII non-noble metals and Group VIA metals. These latter metals include molybdenum, tungsten, nickel and cobalt. Such hydrogenation metal components are usually present in the final catalyst composition as oxides, or more preferably as sulfides when such compounds are readily formed from the particular metal involved. Preferred overall catalyst compositions contain in excess of about 5 weight percent, preferably about 5 to about 40 weight percent molybdenum and/or tungsten, and at least about 0.5 and generally about 1 to about 15 weight percent of nickel and/or cobalt determined as the corresponding oxides. The sulfide form of these metals is most preferred due to higher activity, selectivity and activity retention.

The hydrogenation component is incorporated into the overall catalyst composition by any one of numerous procedures. It can be added either to the zeolite or to the solid source of alumina or to a combination of both. In the alternative, the Group VIII component can be added to the zeolite by co-mulling, impregnation, or ion exchange, and the Group VIA components, i.e. molybdenum and tungsten, can be combined with the solid source of alumina by impregnation, co-mulling or co-precipitation.

Although the hydrogenation component or components may be combined with the catalyst support as the sulfides, that is generally not the case. They are usually added as a metal salt which can be thermally converted to the corresponding oxide in an oxidizing atmosphere or reduced to the metal with hydrogen or other reducing agent. The composition can then be sulfided by reaction with a sulfur donor such as carbon bisulfide, hydrogen sulfide, hydrocarbon thiols, elemental sulfur and the like.

In a preferred embodiment, a boron-containing high SiO$_2$/Al$_2$O$_3$ Zeolite Beta is activated by mulling the zeolite with alpha-alumina monohydrate. The mixture is then extruded, dried, calcined in N$_2$ and then in air, and exchanged with ammonium ions to reduce its sodium content. Finally, a hydrogenation component is incorporated with the catalyst either by ion exchange or by impregnation, followed by calcination in air in the temperature range of 550° F.–1200° F. The catalyst is reduced in hydrogen and presulfided before use.

The catalyst described above is advantageously employed in a hydrocracking process with a heavy hydrocarbon feed. In such a process, the catalyst exhibits unexpectedly good stability in low pressure operation such as at a pressure in the range of 100 to 1000 psig. A preferred pressure range is about 300 to about 750 psig.

The hydrocarbon feedstocks advantageously used in the hydrocracking process of this invention are heavy oils, a substantial fraction or all of which boils above about 700° F. At least about 70 percent of the feed will generally boil between about 650° F. and about 1050° F. Feedstocks having these characteristics include gas oils, vacuum gas oils, topped crudes, deasphalted residua, catalytic cracking cycle stocks, shale oil, tar sand oil, coal tar liquids and the like. The feed to the hydrocracking zone generally contains at least about 5 ppm and usually between about 10 ppm and 0.1 weight percent nitrogen as organic nitrogen compounds. It may also contain substantial amounts of mono- or polynuclear aromatic compounds corresponding to at least about 5 and generally about 5 to about 40 volume percent aromatics. Reaction temperatures exceed about 500° F., and are usually above about 600° F., preferably between 600° F. and 900° F. Hydrogen addition rates should be at least about 400, and are usually between about 2000 and about 15000 standard cubic feet per barrel. Reaction pressure exceeds 100 psig and preferably is within the range of about 300 to about 750 psig. Contact times usually correspond to liquid hourly space velocities in fixed bed catalytic systems less than about 15, preferably between 0.2 and about 4.

A feature of the hydrocracking process of this invention is that it is naphtha directive, i.e. the fraction of hydrocracked product boiling in the $C_5$-330° F. range is higher than expected with conventional Zeolite Beta catalysts. However, a major fraction of the total hydrocracked products remains in the 330° F. distillate range. Another advantageous feature of the invention is that the pour point of the distillate fraction is substantially less than that of the feed.

All of the foregoing conversion occur with increased catalyst life compared with an otherwise similar process operating under comparable conditions but in which a conventional Zeolite Beta is used as the zeolite component. It is a feature of this invention that the refiner may choose to forego some or all of the extended catalyst life in favor of operating at substantially lower pressure, which is of considerable economic advantage. Which option or combination is chosen will of course depend on circumstances, such as whether a new installation is considered.

As with other hydrocracking processes, the feed to the process of this invention may be hydrotreated in a conventional hydrotreating step before being hydrocracked. High pressure hydrotreating may be practiced. In some instances a low pressure hydrotreating may be employed, and the product cascaded to the hydrocracking process of this invention.

EXAMPLES

This invention will now be illustrated by examples which are illustrative and are not to be construed as limiting the scope of the invention. All parts and percentages are by weight unless explicitly stated to be otherwise.

EXAMPLE 1

An as-synthesized boron-containing Zeolite Beta characterized by the ratios $SiO_2/Al_2O_3=145$, and $SiO_2/B_2O_3=29.6$, was mulled and extruded with alumina in a zeolite:alumina weight ratio of 65:35, dried, and calcined at 1000° F. in $N_2$ for 3 hours and then in air for another 3 hours. The resulting extrudate was exchanged twice with 1N $NH_4NO_3$ solution at room temperature for 1 hour, then exchanged with $Pt(NH_3)_4(NO_3)_2$ solution at room temperature for 5 hours, and finally calcined in air at 660° F. for 3 hours. This finished catalyst contained 0.6% Pt and is designated as Catalyst A.

EXAMPLE 2

An 0.6% Pt/Zeolite Beta/$Al_2O_3$ extrudate catalyst was prepared using the same procedures described in Example 1 except that an as-synthesized boron-free Zeolite Beta ($SiO_2/Al_2O_3=40$) was used and the zeolite:alumina weight ratio was 50:50. This catalyst is designated as Catalyst B.

EXAMPLE 3

Prior to catalytic testing, Catalyst A was presulfided overnight at 700° F. with $H_2$ gas containing 2% $H_2S$. The feed, a Minas gas oil (550°–1000° F., 105° F. pour point) was processed in a fixed-bed reactor at 400 psig, 1 LHSV and 2500 SCF/B $H_2$ circulation. The results are given in Table II.

TABLE II

| Time On Stream, Days | 6 | 16 | 28 | 30 |
|---|---|---|---|---|
| Temp., °F. | 810 | 810 | 810 | 810 |
| 650° F.+ Conversion, wt % | 33.7 | 53.0 | 57.3 | 57.6 |
| Pour Point of 330° F.+ Distillate, °F. | +79 | +45 | — | +19 |
| Product Distribution, wt % | | | | |
| $C_1 + C_2$ | 0.4 | 0.3 | 0.3 | 0.3 |
| $C_3 + C_4$ | 4.7 | 19.5 | 23.5 | 23.1 |
| $C_5$-330° F. Naphtha | 9.7 | 21.3 | 24.8 | 24.5 |
| 330° F.+ Distillate | 85.2 | 58.9 | 51.4 | 52.1 |

EXAMPLE 4

The same experiment as described in Example 3 was made, except that Catalyst B was used. The results are given in Table III.

TABLE III

| Time On Stream, Days | 1 | 2 | 8 | 10 | 14 |
|---|---|---|---|---|---|
| Temp., °F. | 750 | 750 | 800 | 810 | 810 |
| 650° F.+ Conversion, wt % | 50 | 14 | 38 | 39 | 37 |
| Pour Point of 330° F.+ Distillate, °F. | +55 | +95 | +86 | +83 | +89 |
| Product Distribution, wt % | | | | | |
| $C_1 + C_2$ | 0.3 | 0.2 | 0.4 | 0.5 | 0.5 |
| $C_3 + C_4$ | 16.2 | 1.8 | 2.8 | 4.1 | 3.5 |
| $C_5$-330° F. Naphtha | 26.4 | 5.7 | 8.5 | 10.7 | 10.2 |
| 330° F.+ Distillate | 57.4 | 92.3 | 88.4 | 84.7 | 85.8 |

What is claimed is:

1. In the method for preparing a hydrocracking catalyst composition comprising a hydrogenation component and a crystalline aluminosilicate cracking component, the improvement which comprises:
   utilizing as a cracking component a crystalline aluminosilicate zeolite that contains alumina and 0.1 wt % to about 4.0 wt % framework boron, said zeolite having a $SiO_2/Al_2O_3$ molar ratio of at least about 35, and the essential X-ray powder diffraction pattern of Zeolite Beta, and including in said composition a solid source of alumina in an amount such that the weight ratio in the final catalyst of said crystalline zeolite to said solid source is from 10:1 to about 1:10.

2. The method described in claim 1 wherein said solid source of alumina is alpha alumina monohydrate, and including the step of intimately mixing said boron-containing zeolite and said solid source of alumina prior to particle formation.

3. A hydrocracking catalyst composition comprising a hydrogenation component, a crystalline aluminosilicate cracking component having the essential X-ray diffraction pattern of Zeolite Beta, said crystalline aluminosilicate being further characterized by the presence of alumina and of 0.1 wt % to about 4.0 wt % of framework boron and a silica to alumina ratio of at least about 35, and a solid source of alumina, said solid source of alumina being present in an amount effective to impart improved catalyst stability.

4. The composition described in claim 3 wherein said crystalline aluminosilicate is the sole cracking component.

5. The composition described in claim 3 wherein said solid source of alumina in alpha alumina monohydrate used as binder for said zeolite component and is present in a weight ratio of said zeolite to said alumina of about 2:3 to about 3:1.

6. The composition of claim 3 wherein said hydrogenation component is platinum or palladium.

7. The composition of claim 3 wherein said zeolite is the sole cracking component and wherein said hydrogenation component is platinum or palladium.

8. The method described in claim 1 including the step of sulfiding said alumina-containing composition.

9. The sulfided composition prepared by the method of claim 8.

* * * * *